United States Patent
Nakamae et al.

(10) Patent No.: US 7,488,016 B2
(45) Date of Patent: Feb. 10, 2009

(54) VEHICLE FRONT STRUCTURE

(75) Inventors: Takayuki Nakamae, Fuchu-cho (JP); Toshio Sakamoto, Fuchu-cho (JP); Yasunori Kageyama, Fuchu-cho (JP); Naoaki Yamamoto, Fuchu-cho (JP); Soukichi Kikuchi, Fuchu-cho (JP); Hiroshi Sogabe, Fuchu-cho (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/826,166

(22) Filed: Jul. 12, 2007

(65) Prior Publication Data
US 2008/0012363 A1 Jan. 17, 2008

(30) Foreign Application Priority Data
Jul. 14, 2006 (JP) .............................. 2006-193801

(51) Int. Cl.
*B60R 19/02* (2006.01)
(52) U.S. Cl. ..................................................... 293/117
(58) Field of Classification Search ................. 293/117, 293/132, 154, 155; 180/68.4, 68.6; 296/187.03, 296/193.09, 203.02
See application file for complete search history.

(56) References Cited

U.S. PATENT DOCUMENTS

| 6,543,523 | B2* | 4/2003 | Hasumi | 165/125 |
|---|---|---|---|---|
| 7,322,639 | B2* | 1/2008 | Takata et al. | 296/187.09 |
| 7,350,609 | B2* | 4/2008 | Udo et al. | 180/68.4 |
| 2005/0279547 | A1* | 12/2005 | Udo et al. | 180/68.4 |
| 2007/0091624 | A1* | 4/2007 | Takata et al. | 362/459 |
| 2007/0182174 | A1* | 8/2007 | Nakayama et al. | 293/115 |
| 2008/0067838 | A1* | 3/2008 | Nakamae et al. | 296/203.02 |

FOREIGN PATENT DOCUMENTS

| JP | 2006-001358 | 1/2006 |
|---|---|---|
| JP | 2006-1358 | 1/2006 |
| WO | 01/00478 | 1/2001 |

OTHER PUBLICATIONS

Extended European Search Report issued in corresponding European Patent Application No. 07112122.2, mailed on Jan. 30, 2008.

* cited by examiner

*Primary Examiner*—H Gutman

(57) ABSTRACT

Disclosed is a vehicle front structure, which comprises a synthetic resin shroud 3 formed to support a heat exchanger and mounted to a vehicle body in a front of an engine compartment, a bumper fascia disposed in a front end of the vehicle body, a plate member 20 which has a front end located adjacent to a rear surface of the bumper fascia and a rear end attached to a lower shroud section 5, and a connection member 30 which connects a lower end region of a lateral surface of a side shroud section 6 to a non-abutted portion 13c formed in a flange 13 of a bumper reinforcement 10. The vehicle front structure of the present invention can suppress displacement of the shroud during a frontal impact with a pedestrian or an obstacle such as a curb.

7 Claims, 6 Drawing Sheets

VEHICLE FRONT STRUCTURE

BACKGROUND OF THE INVENTION

1. Field of the Invention

The present invention relates to a vehicle front structure, and more particularly to a vehicle front structure designed to prevent a shroud supporting a heat exchanger from being displaced rearwardly when a large impact load is applied rearwardly against a front end of a vehicle body.

2. Description of the Related Art

Generally, a vehicle is provided with a shroud for mounting thereto a heat exchanger, such as a radiator or a condenser, in a front thereof. This shroud has an upper shroud section, a lower shroud section and a pair of right and left side shroud sections, which define a generally rectangular frame-like shape. The shroud is disposed on a rear side relative to and in adjacent relation to a front bumper of the vehicle. In some cases, a plate member is disposed on a front side relative to the lower shroud section. This plate member is provided as a means to, in the event of a frontal impact with a pedestrian, flick legs of the pedestrian so as to prevent the pedestrian from getting into under the vehicle.

In connection with the above type of vehicle front structure, JP 2006-001358A (Patent Publication 1) discloses a vehicle front structure comprising a plate member which is formed to have a lateral length (a length in a width, i.e., lateral, direction of a vehicle body) approximately equal to that of a lower shroud section, and disposed on a front side relative to the lower shroud section.

Specifically, in the vehicle front structure disclosed in the Patent Publication 1, the lower shroud section is formed with a plate-shaped extension portion extending frontwardly from a front end thereof, and the plate member is fastened to the extension portion with a bolt. That is, the vehicle front structure is intended to allow the lower shroud section to receive and absorb an impact load through the plate member during a frontal impact with a pedestrian or an obstacle. However, if a large impact load is applied rearwardly against the plate member during a frontal impact with a pedestrian or an obstacle such as a curb, this vehicle front structure is likely to fail in allowing the lower shroud section to sufficiently absorb the impact load, and thereby cause a rearward displacement of the lower shroud section. Consequently, the lower shroud section is likely to hit against a heat exchanger, resulting in damage to the lower shroud section and the heat exchanger.

SUMMARY OF THE INVENTION

In view of the above circumstances, it is an object of the present invention to provide a vehicle front structure capable of preventing a lower shroud section from being displaced rearwardly due to an impact load during a frontal impact with a pedestrian or an obstacle such as a curb.

In order to achieve this object, the present invention provides a vehicle front structure having an engine compartment provided with a heat exchanger. The vehicle front structure comprises a synthetic resin shroud formed to support the heat exchanger and mounted to a vehicle body in a front of the engine compartment, a bumper fascia disposed in a front end of the vehicle body on a front side relative to the shroud, a plate member formed in a shape which extends frontwardly from the shroud to a position adjacent to a rear surface of the bumper fascia, and has a rear end attached to a lower shroud section forming a lower edge portion of the shroud, and a connection member which connects a lower portion of the shroud to the vehicle body at a rear side relative to the lower portion of the shroud.

According to the present invention, in the vehicle front structure comprising the synthetic resin shroud, the bumper fascia and the plate member, the lower portion of the shroud is connected to the vehicle body at the rear side relative thereto by the connection member. That is, in this vehicle front structure, the vehicle body supports the lower portion of the shroud at the rear side relative to the shroud, through the connection member. Thus, in the event of a frontal impact with a pedestrian or an obstacle such as a curb, even if a large impact load is transmitted rearwardly to the lower shroud section through the plate member, the vehicle body can receive the impact load through the connection member and sufficiently absorb the impact load to suppress a deformation of the shroud.

The above and other objects, features and advantages of the invention will become more apparent upon reading the following detailed description along with the accompanying drawings.

DESCRIPTION OF THE PREFERRED EMBODIMENTS

With reference to the drawings, the present invention will now be described based on one embodiment thereof.

Figure 1:
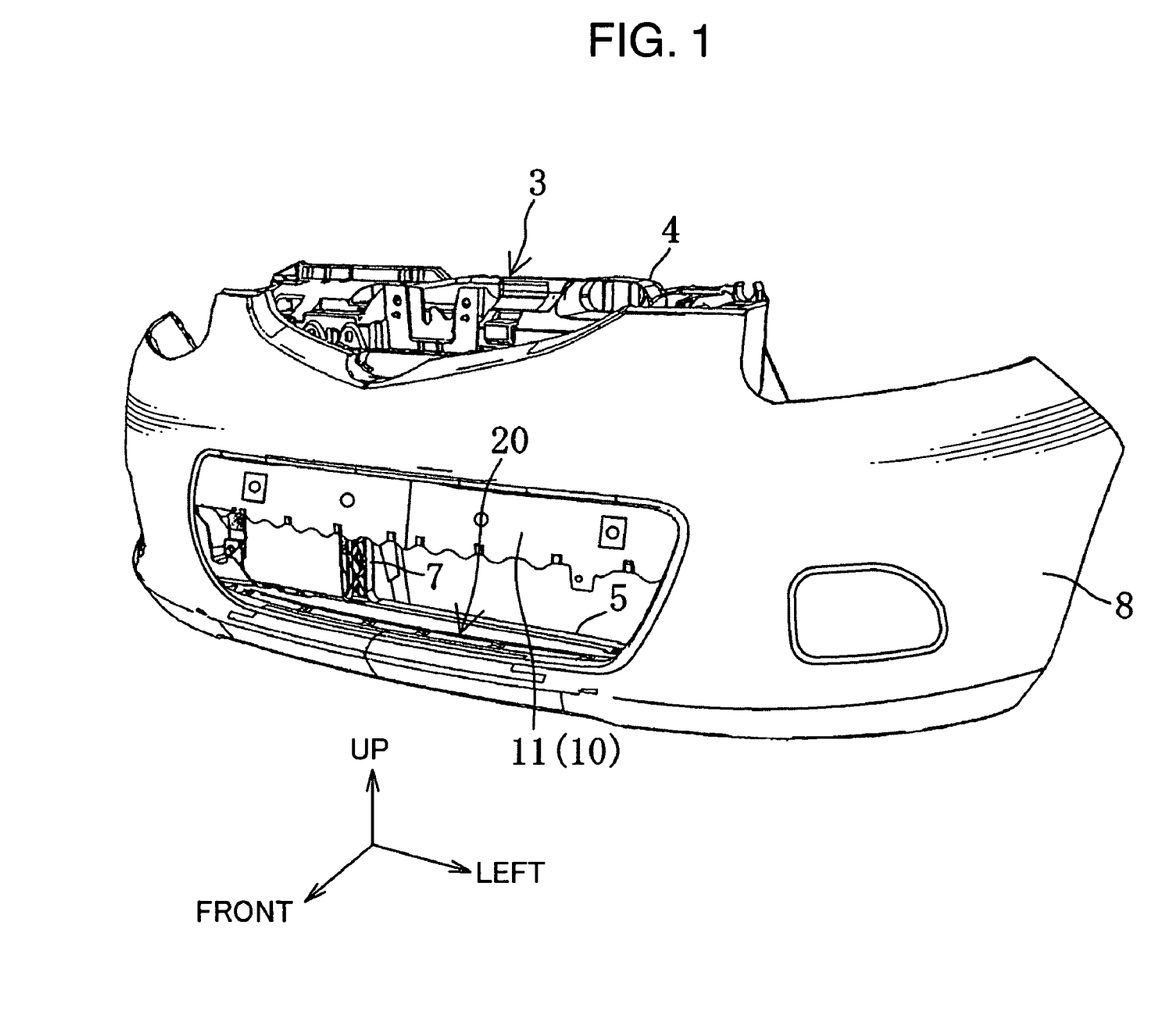
FIG. 1 is a perspective view showing a vehicle front structure according to one embodiment of the present invention.
Figure 2:
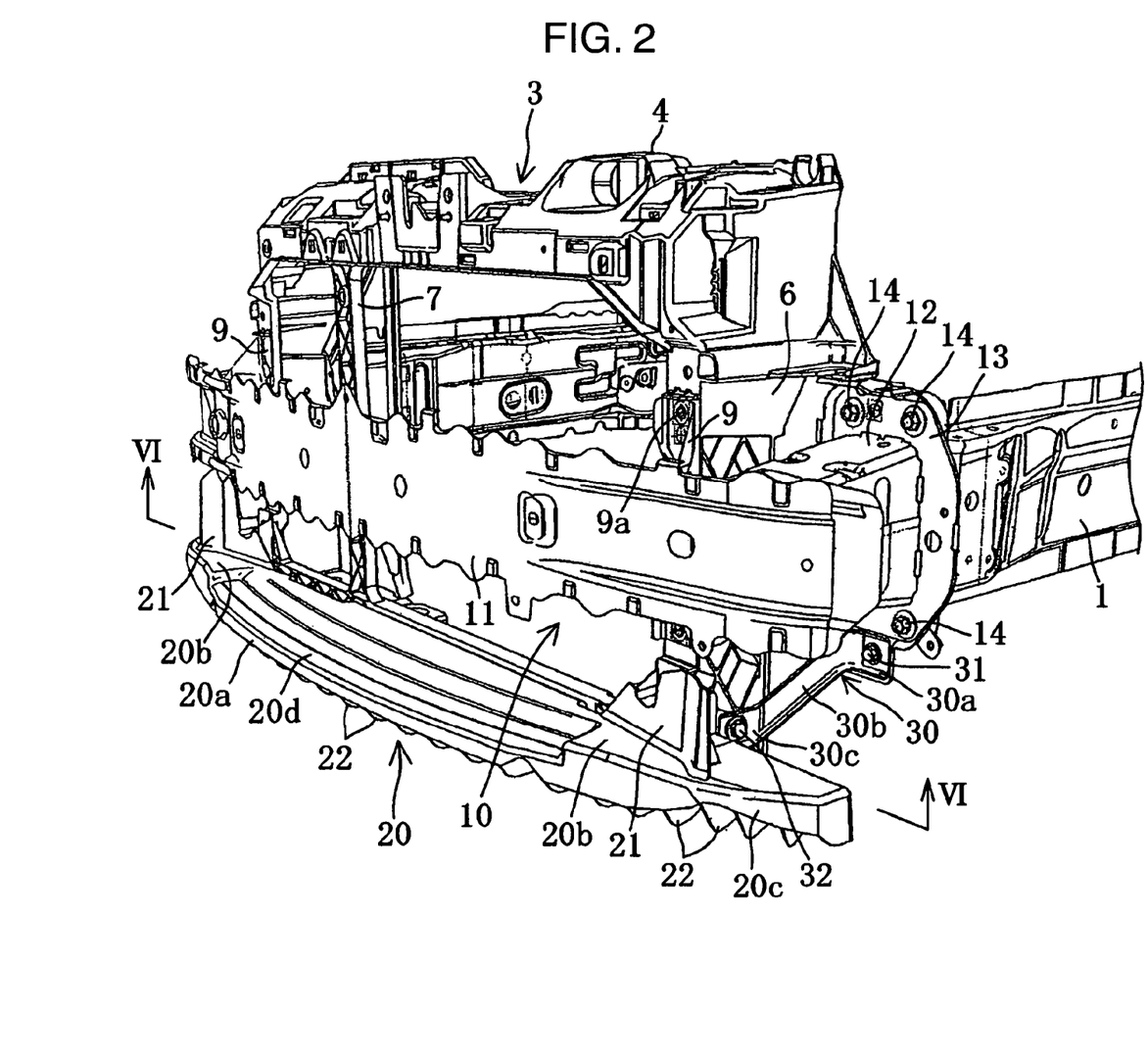
FIG. 2 is a fragmentary perspective view showing the vehicle front structure.
Figure 3:
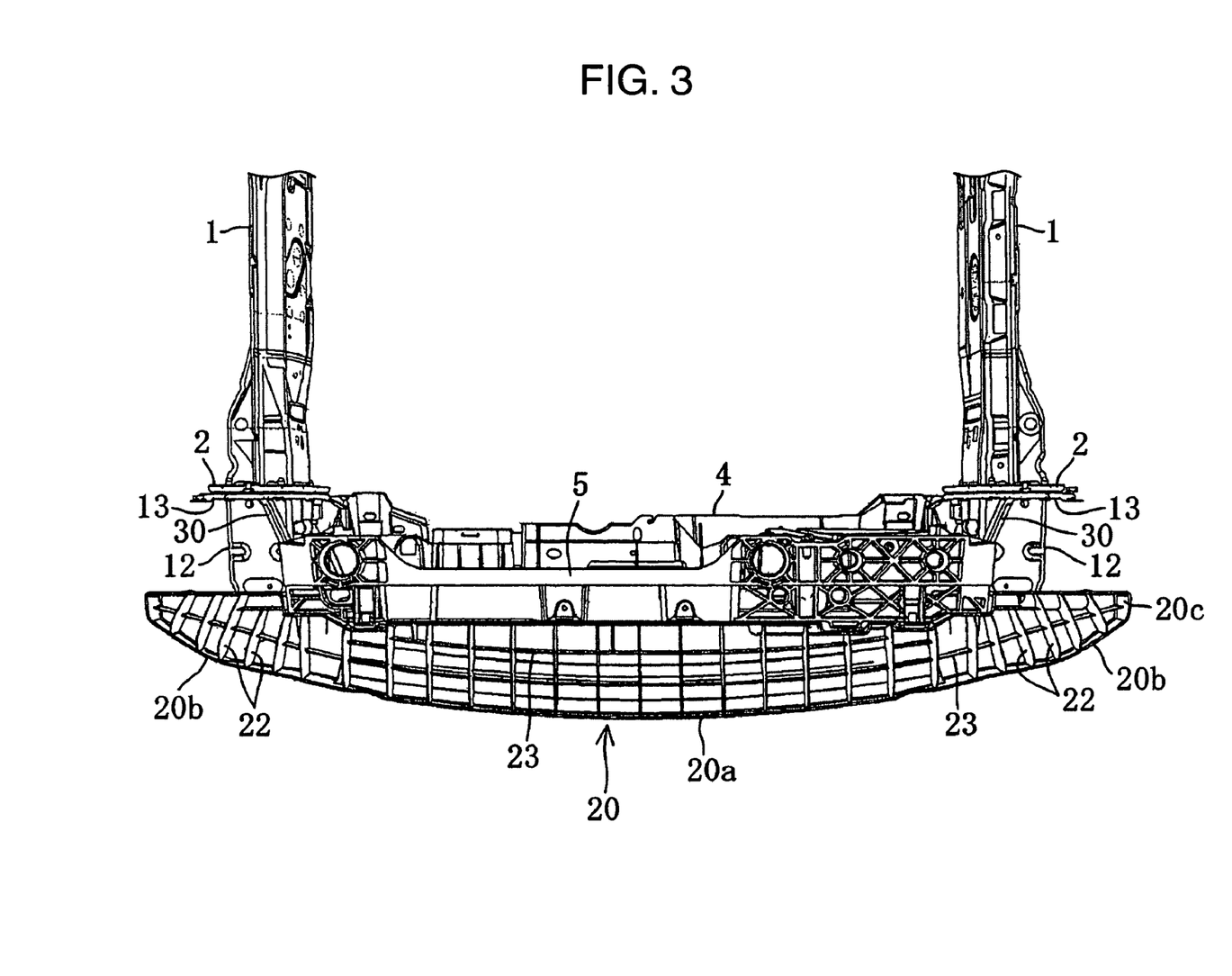
FIG. 3 is a fragmentary bottom view showing the vehicle front structure.
Figure 4:
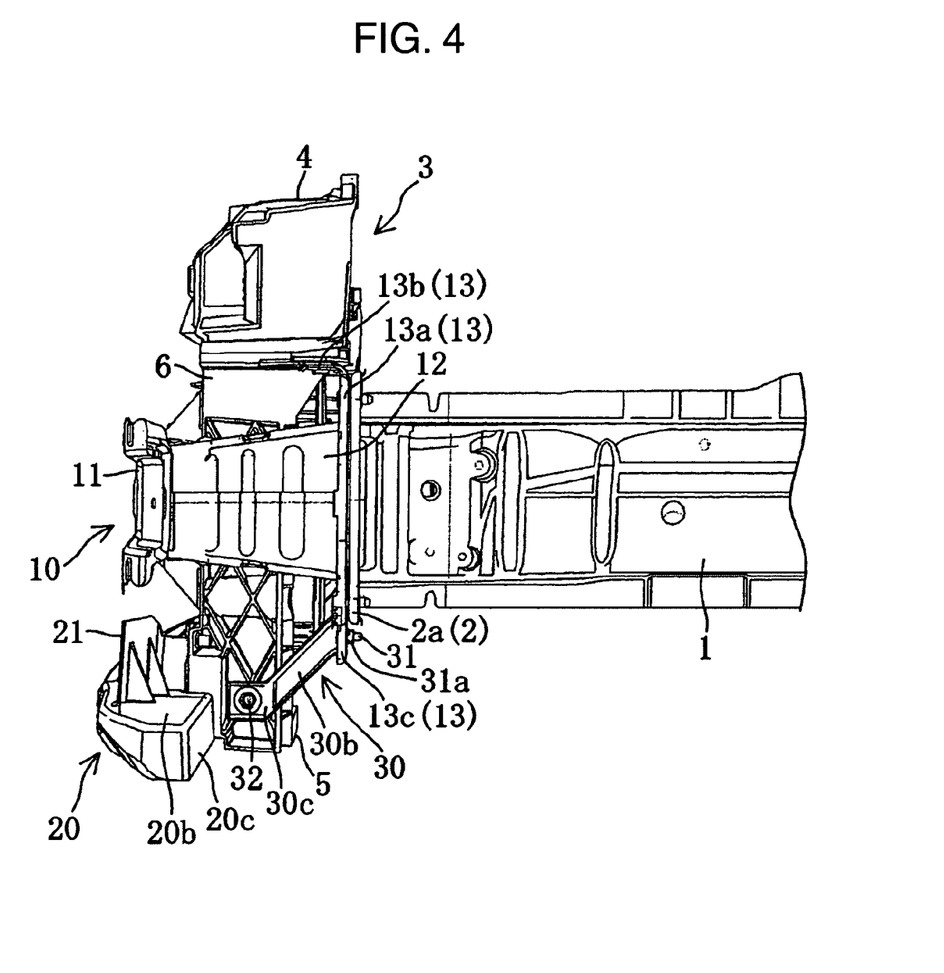
FIG. 4 is a fragmentary side view showing the vehicle front structure.
Figure 5:
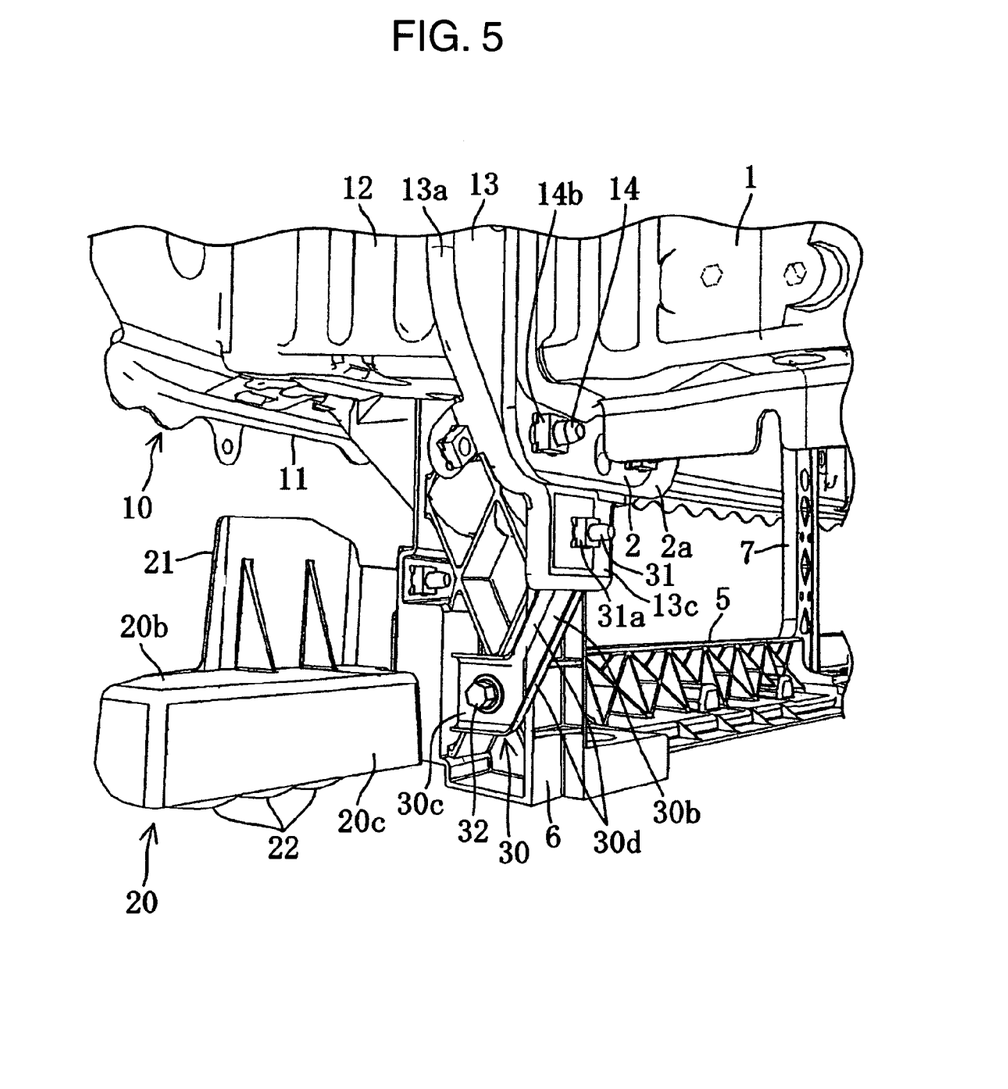
FIG. 5 is a fragmentary enlarged perspective view showing connection portions of a connection member relative to a lower shroud section and a crush can.

As shown in FIGS. 1 and 2, a vehicle front structure comprises a front side frame 1, a bumper reinforcement 10, a shroud 3 made of a synthetic resin, a plate member 20 and a bumper fascia 8. Further, a shock absorbing pad made of an expandable synthetic resin is disposed, but not shown, on a front side relative to the bumper reinforcement 10.

The front side frame 1 consists of a pair of right and left frames each extending in a frontward/rearward, i.e., longitudinal, direction of a vehicle body. The bumper reinforcement 10 is detachably fastened to respective front ends of the front side frames 1. The shroud 3 is formed to support a heat exchanger (not shown), and mounted to the vehicle body in a front of an engine compartment (not shown). The plate member 20 has a rear end attached to an after-mentioned lower shroud section 5. The bumper fascia 8 is disposed in a front end of the vehicle body.

As shown in FIGS. 2 to 5, each of the pair of right and left front side frames 1 has a flange 2 formed at the front end thereof. The flange 2 has a rear surface formed with a peripheral wall 2a along an entire outer peripheral edge thereof.

The bumper reinforcement 10 includes a pair of right and left crush cans 12 each having a rear end connected to the front end of a corresponding one of the right and left front frames 1, and a reinforcement body 11 connecting between respective front ends of the crush cans 12.

The crush can 12 is formed in a square tubular shape, and adapted to be compressingly deformed and collapsed by an impact load applied rearwardly through the reinforcement body 11 during a frontal impact with a pedestrian or an obstacle. The shape and dimensions of the crush can 12 are set to cause the collapse in response to the frontal impact so as to adequately absorb impact energy to achieve an intended energy absorbing function.

The rear end of each of the right and left crush cans 12 is formed with a flange 13 adapted to be abutted to and fastened to the flange 2 of a corresponding one of the front side frames 1. The flange 13 of the crush can 12 is fastened to the flange 2 of the side frame 1 with a bolt 14 and a nut 14a.

The flange 13 has a front surface formed with a peripheral wall 13a along an entire outer peripheral edge thereof. The flange 13 has an upper edge formed as a bend portion 13b bended to protrude frontwardly. Specifically, in each of the crush cans 12, the bend portion 13b is formed to allow a rear portion of an upper end of each of after-mentioned side shroud sections 6 to be fastened to an upper surface thereof with a bolt and a nut.

The flange 13 formed in each of the crush cans 12 has a lower end formed as a non-abutted portion 13c devoid of an abutted contact with the flange 2 of the corresponding front side frame 1. The non-abutted portion has a rectangular shape in front view.

As shown in FIG. 2, the shroud 3 is disposed on a front side relative to the front side frames 1, and in an approximately vertical posture. The shroud 3 has an upper shroud section 5, a lower shroud section 5 and a pair of right and left side shroud sections 6. The upper shroud section 4 is designed to support an upper portion of the heat exchanger. The lower shroud section 5 is designed to support a lower portion of the heat exchanger. Each of the side shroud sections 6 has a shape which extends from a corresponding one of right and left ends of the lower shroud section 5 to a corresponding one of right and left ends of the upper shroud section 4. The shroud 3 is a single-piece product prepared by forming the lower shroud section 5, the upper shroud section 4 and the side shroud sections 6 through an integral molding process. The shroud 3 has a rectangular frame-like shape in front view. The upper shroud section 4 and the lower shroud section 5 are provided with a steel shroud stay 7 at a position slightly on a right side relative to a lateral center of the upper and lower shroud sections 4, 5. The shroud stay 7 is disposed to extend approximately vertically and connect between the upper and lower shroud sections 4, 5 so as to ensure desired stiffness of the shroud 3.

Figure 6:
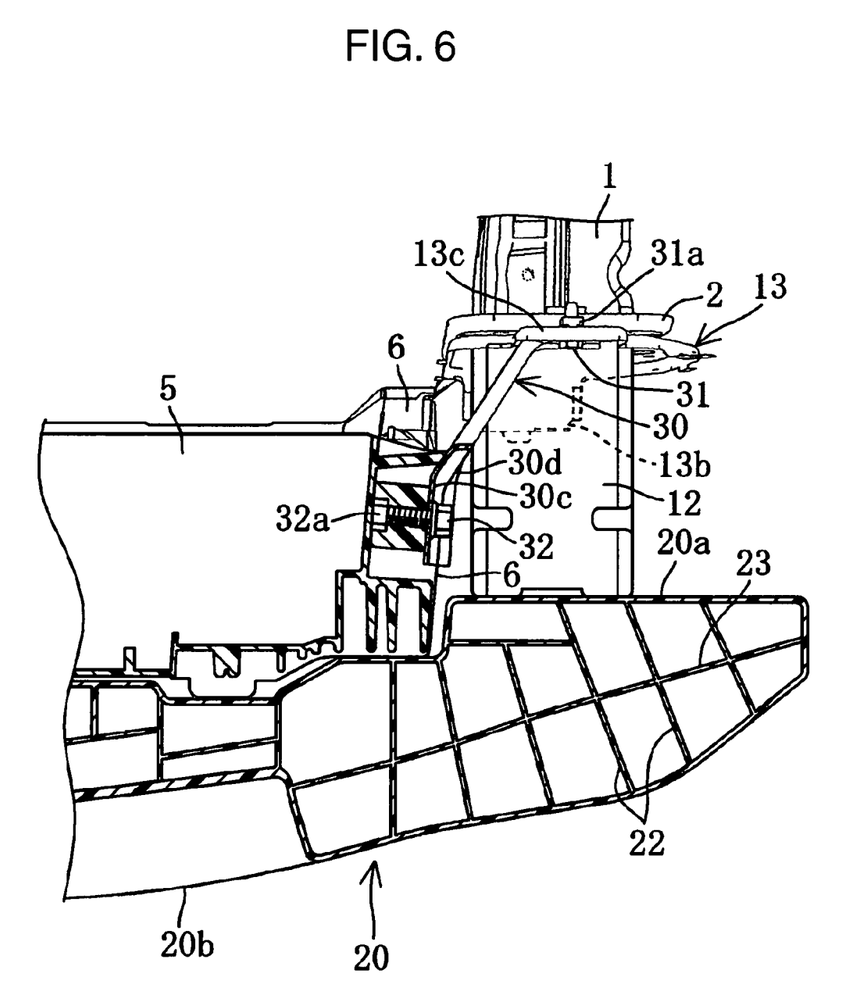
FIG. 6 is a sectional view taken along the line VI-VI in FIG. 2.

Each of the pair of right and left side shroud sections 6 is provided with a shroud-supporting joint member 9 fastened to a vertically central region of a front surface thereof with a bolt 9a and a nut. The shroud-supporting joint member 9 serves as a means to connect the side shroud section 6 to the reinforcement body 11 of the bumper reinforcement 10. Specifically, the reinforcement body 11 is joined to a front surface of the shroud-supporting joint member 9. Further, as shown in FIG. 6, each of the pair of right and left side shroud sections 6 has a lower portion formed with a nut 32a through an insert molding process. The nut 32a is disposed to allow a bolt 32 for fastening an after-mentioned connection member 30 to be screwed therewith.

The plate member 20 will be specifically described below.

As shown in FIGS. 1 to 6, the plate member 20 extending in a width, i.e., lateral, direction of the vehicle body is disposed on a front side relative to the lower shroud section 5.

The plate member 20 is formed to have a size and shape capable of achieving an intended leg-flicking function of flicking legs of a pedestrian during a frontal impact with the pedestrian.

The plate member 20 comprises a plate body 20a, and a pair of extension portions 20b formed to extend laterally outwardly from respective opposite lateral edges of the plate body 20a. The plate member 20 has a bottom surface surrounded by a peripheral wall 20c formed to extend along an entire outer peripheral edge thereof. The plate member 20 is formed to extend frontwardly up to a position adjacent to a rear surface of the bumper fascia 8, and have a curved-shaped front edge which gradually curves rearwardly in a direction from a laterally central region to each of opposite lateral edges thereof. The plate member 20 has a rear edge formed to come into contact with a front surface of the lower shroud section 5 when the plate member 20 is attached to the lower shroud section 5.

The plate body 20a is formed with a step-down portion 20d in a front region of an upper surface thereof to prevent a rear end of the bumper fascia 8 from coming into contact with the plate body 20a. Further, the plate member 20 is formed with a pair of sealing walls 21 on respective upper surfaces of opposite lateral ends including the extension portions. Each of the sealing walls 21 is formed to extend upwardly from the upper surface so as to seal at least a part of a gap between the bumper fascia 8 and a corresponding one of the side shroud sections 6. The bottom surface of the plate body 20a and the extension portions 20b is formed with a plurality of longitudinal ribs 22 extending in the longitudinal direction of the vehicle body at predetermined intervals, and a plurality of lateral ribs 22 extending in the lateral direction of the vehicle body at predetermined intervals.

A connection member 30 will be described below.

As shown in FIGS. 2 to 6, a pair of connection members 30 are disposed just behind the respective lateral edges of the plate body 20a. Each of the connection members 30 to connect a lower end region of a lateral surface of a corresponding one of the side shroud sections 6 to the flange 13 of a corresponding one of the crush cans 12. The connection member 30 has a rear plate portion 30a, an inclined portion 30b, a front plate portion 30c and a peripheral wall 30d. The rear plate portion 30a is formed in a shape abuttable and fastenable to the non-abutted portion 13c of the flange 13 of the crush can 12. The inclined portion 30b is formed to continuously extend from the rear plate portion 30a and have a shape which gradually inclines upwardly and laterally outwardly in the rearward direction of the vehicle body. The front plate portion 30c is formed to continuously extend from the inclined portion 30b and have a shape abuttable and fastenable to the lower end region of the lateral surface of the side shroud section 6. The peripheral wall 30d is formed along upper and lower edges of a laterally outer surface of the connection member 30.

The rear plate portion 30a of the connection member 30 is fastened to a front surface of the non-abutted portion 13c of the flange 13 of the crush can 12 with a bolt 31 and a nut 31a, and the front plate 30c of the connection member 30 is fastened to the lower end region of the lateral surface of the side shroud section 6 with the bolt 32 and the nut 32a. Thus, the connection member 30 connects between the flange 13 of the crush can 12 and the lower end region of the lateral surface of the side shroud section 6.

A function of the vehicle front structure according to this embodiment will be described below.

When a large impact load is applied rearwardly against the plate member 20 during a frontal impact with a pedestrian or an obstacle such as a curb, the impact load is transmitted from the plate member 20 to the lower shroud section 5. In this vehicle front structure, the lower end region of the lateral surface of the side shroud section 6 is supported by the flange 13 of the crush can 12 disposed on the rear side relative to the shroud 3, through the connection member 30. Thus, the impact load transmitted to the lower shroud section 5 is received by the flange 13 of the crush can 12.

As mentioned above, in the above embodiment, the vehicle front structure which comprises the synthetic resin shroud 3, the bumper fascia 8, the plate member 20, and the connection member 30 connecting between the lower end region of the lateral surface of the side shroud section 6 and the crush can 12, has relatively high stiffness for supporting the lower portion of the shroud 3. Further, when a large impact load is applied rearwardly against the plate member 20 during a frontal impact with a pedestrian or an obstacle such as a curb, the crush can 12 on the rear side relative to the shroud 3 can receive and sufficiently absorb the impact load transmitted from the plate member 20 to suppress a rearward displacement of the lower shroud section 5. In addition, the crush can 12 can prevent the impact load from be transmitted to the front side frame 1 fastened to the rear end thereof so as to suppress a deformation of the front side frame 1.

In the above embodiment, the bumper reinforcement is disposed above the lower portion of the shroud. Further, the front end of the connection member 30 is attached to the lower end region of the lateral surface of the side shroud section 6, and the rear end of the connection member 30 is attached to the lower portion of the flange 13 which is formed in the crush can 12 of the bumper reinforcement and abutted to and fastened to the flange 2 of the front side frame 1. Thus, the rear and front ends of the connection member 30 can be located vertically close to each other. That is, an amount of vertical offset in respective mounting positions of the front and rear ends of the connection member 30 can be reduced to provide higher stiffness for supporting the lower portion of the shroud 3. In addition, as mentioned above, the connection member 30 is disposed just behind the lateral edge of the plate body 20a. Thus, the connection member 30 can reliably transmit an impact load from the plate member 20.

In the above embodiment, the flange 13 of the crush can 12 is formed with the non-abutted portion 13c devoid of an abutted contact with the flange 2 of the front side frame 1, and the rear end of the connection member 30 is attached to the non-abutted portion 13c. Thus, when a large impact load is applied rearwardly against the plate member 20 during a frontal impact with a pedestrian or an obstacle such as a curb, the non-abutted portion 13c can be deformed to absorb impact energy during the frontal impact so as to allow the applied impact load to be reliably received by the flange 13 of the crush can 12.

For example, the above embodiment may be partially modified as follows: The front and rear ends of the connection member may be attached at approximately the same height position. Further, the size of the non-abutted portion 13c of the flange 13 may be increased, and the inclined portion of the connection member may be formed to incline laterally outward without an inclination in the vertical direction.

In sum, the present invention provides a vehicle front structure having an engine compartment provided with a heat exchanger. The vehicle front structure comprises a synthetic resin shroud formed to support the heat exchanger and mounted to a vehicle body in a front of the engine compartment, a bumper fascia disposed in a front end of the vehicle body on a front side relative to the shroud, a plate member formed in a shape which extends frontwardly from the shroud to a position adjacent to a rear surface of the bumper fascia, and has a rear end attached to a lower shroud section forming a lower edge portion of the shroud, and a connection member which connects a lower portion of the shroud to the vehicle body at a rear side relative to the lower portion of the shroud.

According to the present invention, in the vehicle front structure comprising the synthetic resin shroud, the bumper fascia and the plate member, the lower portion of the shroud is connected to the vehicle body at the rear side relative thereto by the connection member. That is, in this vehicle front structure, the vehicle body supports the lower portion of the shroud at the rear side relative to the shroud, through the connection member. Thus, in the event of a frontal impact with a pedestrian or an obstacle such as a curb, even if a large impact load is transmitted rearwardly to the lower shroud section through the plate member, the vehicle body can receive the impact load through the connection member and sufficiently absorb the impact load to suppress a deformation of the shroud.

In a preferred embodiment of the present invention (as set forth in original claim 2), when the vehicle body includes a front side frame extending in a longitudinal direction thereof, and a bumper reinforcement detachably fastened to a front end of the front side frame, the shroud is disposed on a front side relative to the front side frame, and the connection member has a rear end attached to the bumper reinforcement.

According to this vehicle front structure, the connection member allows an impact load transmitted from the plate member to the lower shroud section, to be received and absorbed by the bumper reinforcement, so as to suppress transmission of the impact load to the front side frame fastened to the rear end of the bumper reinforcement. This makes it possible to suppress a deformation of the front side frame.

In a preferred embodiment of the present invention (as set forth in the original claim 3), the front end of the front side frame is formed with a flange, and the bumper reinforcement includes a crush can having a flange which is abutted to and fastened to the flange of the front side frame. Further, the rear end of the connection member is attached to a lower portion of the flange of the crush can.

According to this vehicle front structure, the bumper reinforcement includes the crush can crush connected to the front end of the front side frame, and the crush can is designed to absorb an impact load applied to the bumper reinforcement. That is, the crush can function to prevent the impact load to be transmitted to the front side frame so as to suppress a deformation of the front side frame.

Further, according to this vehicle front structure, the rear end of the connection member is attached to the lower portion of the flange of the crush can. That is, the vehicle front structure is designed to allow the rear end of the connection member to be located at a relatively low height position. Thus, when the lower portion of the shroud as a mounting position of the front end of the connection member is located on a lower side relative to a portion of the bumper reinforcement (specifically, the crush can) as a mounting position of the rear end of the connection member, i.e., the front and rear ends of the connection member are offset from each other in a vertical direction, an amount of the offset can be reduced. This makes it possible to allow the connection member to have higher strength for supporting the lower portion of the shroud.

In a preferred embodiment of the present invention (as set forth in the original claim 4), the flange of the crush can has a non-abutted portion devoid of an abutted contact with the flange of the front side frame, and the rear end of the connection member is attached to the non-abutted portion.

According to this vehicle front structure, when a large impact load is applied rearwardly against the plate member during a frontal impact with a pedestrian or an obstacle such as a curb, the non-abutted portion is deformed to absorb impact energy transmitted to the bumper reinforcement through the connection member. That is, this vehicle front structure allows the impact load to be reliably received by the flange of the bumper reinforcement.

In a preferred embodiment of the present invention (as set forth in the original claim 5), the shroud has a side shroud section extending upwardly from each of opposite ends of the lower shroud section, and the connection member has a front end attached to a lower region of a lateral surface of the side shroud section.

According to this vehicle front structure, the front end of the connection member is attached to the lower region of the lateral surface of the side shroud section extending upwardly from each of the opposite ends of the lower shroud section, so as to allow the front end of the connection member to be set at a relatively high height position. Thus, when a mounting position of the rear end of the connection member is located on an upper side relative to the lower portion of the shroud as a mounting position of the front end of the connection member, an amount of vertical offset between the front and rear ends of the connection member can be reduced. This makes it possible to allow the connection member to have higher strength for supporting the lower portion of the shroud.

As above, according to the present invention, the connection member allows the shroud to be supported by the vehicle body therethrough so as to suppress a deformation of the shroud.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent Application Serial No. 2006-193801, filed in Japan Patent Office on Jul. 14, 2006, the contents of which are hereby incorporated by reference.

What is claimed is:

1. A vehicle front structure having an engine compartment provided with a heat exchanger, comprising:
    a shroud made of a synthetic resin, said shroud being formed to support said heat exchanger and mounted to a vehicle body in a front of said engine compartment;
    a bumper fascia disposed in a front end of the vehicle body on a front side relative to said shroud;
    a plate member formed in a shape which extends frontwardly from said shroud to a position adjacent to a rear surface of said bumper fascia, and has a rear end attached to a lower shroud section forming a lower edge portion of said shroud; and
    a connection member which connects said shroud to the vehicle body, wherein
    said vehicle body includes
        a front side frame extending in a longitudinal direction thereof, and
        a bumper reinforcement detachably fastened to a front end of said front side frame;
    said bumper reinforcement includes a crush can having a flange;
    said shroud is disposed on a front side relative to said front side frame;
    said front end of said front side frame is formed with a flange;
    said flange of the crush can is abutted to and fastened to said flange of said front side frame; and
    said connection member, being a separate member from said shroud, having a first end and a second end, extending downwardly from the first end to the second end, where the first end is connected to the bumper reinforcement and the second end is connected to the shroud at a position rear of the plate member.

2. The vehicle front structure as defined in claim 1, wherein said first end of the connection member is connected to the crush can of the bumper reinforcement.

3. The vehicle front structure as defined in claim 1, wherein said first end of the connection member is connected to the crush can of the bumper reinforcement and extends from the connected point of the crush can downwardly and forwardly to the second end.

4. The vehicle front structure as defined in claim 1, wherein said first end of the connection member is fixed to a rear end of the crush can.

5. The vehicle front structure as defined in claim 1, wherein said shroud, being in upright posture, is disposed between said bumper reinforcement and the front side frame.

6. A vehicle front structure having an engine compartment provided with a heat exchanger, comprising:
    a shroud made of a synthetic resin, said shroud being formed to support said heat exchanger and mounted to a vehicle body in a front of said engine compartment;
    a bumper fascia disposed in a front end of the vehicle body on a front side relative to said shroud;
    a plate member formed in a shape which extends frontwardly from said shroud to a position adjacent to a rear surface of said bumper fascia, and has a rear end attached to a lower shroud section forming a lower edge portion of said shroud; and
    a connection member which connects a lower portion of said shroud to the vehicle body at a rear side relative to said lower portion of said shroud, wherein
    said vehicle body includes a front side frame extending in a longitudinal direction thereof, and a bumper reinforcement detachably fastened to a front end of said front side frame;
    said shroud is disposed on a front side relative to said front side frame;
    said connection member has a rear end attached to said bumper reinforcement;
    said front end of said front side frame is formed with a flange;
    said bumper reinforcement includes a crush can having a flange which is abutted to and fastened to said flange of said front side frame;
    said flange of said crush can has a non-abutted portion devoid of an abutted contact with said flange of said front side frame; and
    said rear end of said connection member is attached to said non-abutted portion.

7. A vehicle front structure having an engine compartment provided with a heat exchanger, comprising:
    a shroud made of a synthetic resin, said shroud being formed to support said heat exchanger and mounted to a vehicle body in a front of said engine compartment;
    a bumper fascia disposed in a front end of the vehicle body on a front side relative to said shroud;

a plate member formed in a shape which extends frontwardly from said shroud to a position adjacent to a rear surface of said bumper fascia, and has a rear end attached to a lower shroud section forming a lower edge portion of said shroud; and a connection member which connects a lower portion of said shroud to the vehicle body at a rear side relative to said lower portion of said shroud, said shroud having a side shroud section extending upwardly from each of opposite ends of said lower shroud section, and said connection member having a front end attached to a lower region of a lateral surface of said side shroud section.

* * * * *